United States Patent
Yang et al.

(10) Patent No.: US 7,133,954 B2
(45) Date of Patent: Nov. 7, 2006

(54) DATA BUS SYSTEM FOR MICRO CONTROLLER

(75) Inventors: Yil-suk Yang, Daejeon (KR); Jong-dae Kim, Daejeon (KR); Tae-moon Roh, Daejeon (KR); Dae-woo Lee, Daejeon (KR); Sang-gi Kim, Daejeon (KR); Il-yong Park, Pyungtaek (KR); Byoung-gon Yu, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 351 days.

(21) Appl. No.: 10/625,126

(22) Filed: Jul. 22, 2003

(65) Prior Publication Data

US 2004/0177173 A1 Sep. 9, 2004

(30) Foreign Application Priority Data

Oct. 9, 2002 (KR) ............... 10-2002-0061487

(51) Int. Cl.
G06F 13/00 (2006.01)
G06F 13/40 (2006.01)

(52) U.S. Cl. ............. 710/305; 710/306; 710/311; 710/104; 712/33

(58) Field of Classification Search ............... 710/114, 710/305, 306, 311, 316; 712/33
See application file for complete search history.

(56) References Cited

U.S. PATENT DOCUMENTS

| | | | |
|---|---|---|---|
| 4,984,195 A * | 1/1991 | Nakamura et al. ......... 710/300 |
| 5,125,080 A * | 6/1992 | Pleva et al. ............... 710/305 |
| 5,537,517 A * | 7/1996 | Wakabayashi et al. ..... 358/1.16 |
| 5,930,523 A * | 7/1999 | Kawasaki et al. ........... 712/32 |
| 5,935,231 A * | 8/1999 | Okazawa et al. .......... 710/306 |
| 6,088,783 A * | 7/2000 | Morton ...................... 712/22 |
| 6,401,197 B1 | 6/2002 | Kondo |
| 6,411,984 B1 | 6/2002 | Leach et al. |
| 6,725,307 B1 * | 4/2004 | Alvarez et al. ............ 710/110 |
| 6,816,750 B1 * | 11/2004 | Klaas ....................... 700/121 |
| 2001/0011353 A1 * | 8/2001 | Little et al. .............. 713/200 |
| 2002/0035650 A1 * | 3/2002 | Nakamoto et al. ........... 710/5 |

\* cited by examiner

*Primary Examiner*—Kim Huynh
*Assistant Examiner*—Scott Sun
(74) *Attorney, Agent, or Firm*—Blakely Sokoloff Taylor & Zafman

(57) ABSTRACT

Provided is a data bus system for a micro controller which has an input/output (I/O) unit, a central processing unit (CPU), an internal memory unit, and a peripheral circuitry. The data bus system includes an external access bus used when data is output from the CPU or data is input to the I/O unit or the internal memory unit; an internal access bus used when data is input to the CPU, data is output from the I/O unit or the internal memory unit, or data is input to or output from the peripheral circuitry; and an internal memory test bus used when data is output from the internal memory unit and input to the I/O unit.

14 Claims, 3 Drawing Sheets

DATA BUS SYSTEM FOR MICRO CONTROLLER

BACKGROUND OF THE INVENTION

This application claims the priority of Korean Patent Application No. 2002-61487, filed 9 Oct. 2002 in the Korean Intellectual Property Office (KIPO), which is incorporated herein in its entirety by reference.

1. Field of the Invention

The present invention relates to a data bus system for a micro controller, and more particularly, to a data bus system for a micro controller having a plurality of sub data buses.

2. Description of the Related Art

In general, a microprocessor is one of various types of central processing units (CPUs), which is a semiconductor device in which a CPU of a computer is integrated on a single integrated circuit. A micro controller refers to a single chip with the built-in CPU, storage unit having a certain capacity, and input/output (I/O) control circuit. In the micro controller, movement of data within the micro controller is made via a data bus, and a system relating to the movement of data via the data bus is called a data bus system.

FIG. 1 is a block diagram of an example of conventional data bus systems for a micro controller. Referring to FIG. 1, the data bus system includes a data bus 102 and an address bus 104 which are connected to an I/O unit 112, a CPU 114, a memory unit 116, and a peripheral circuitry 118. Therefore, via the data bus 102, data is moved between the CPU 114 and the memory unit 116, between the CPU 114 and the peripheral circuitry 18, or between the CPU 114 and the I/O unit 112. During the movement of data, only one block related to the movement of data is open, thereby preventing the other blocks from interrupting the exchange of data.

However, the conventional data bus system is disadvantageous in that one data bus 102 is shared by the I/O unit 112, the CPU 114, the memory unit 116, and the peripheral circuitry 118. In this case, a greater amount of load capacitance is weighed on the data bus 102. Moreover, as the number of peripheral circuits installed in a micro controller is increased, the amount of data input to and output from the peripheral circuits are increased, thereby increasing loads weighed on the data bus 102. An increase in the loads on the data bus 102 results in a reduction in the operational speed of a data bus system and an increase in power consumption therein.

SUMMARY OF THE INVENTION

The present invention provides a data bus system for a micro controller, in which load capacitance of a data bus constituting the data bus system decreases to increase the operational speed of the data bus system and reduce power consumption therein.

According to one aspect of the present invention, there is provided a data bus system that has an input/output (I/O) unit, a central processing unit (CPU), an internal memory unit, and a peripheral circuitry, the data bus system including an external access bus used when data is output from the CPU or data is input to the I/O unit or the internal memory unit; an internal access bus used when data is input to the CPU, data is output from the I/O unit or the internal memory unit, or data is input to or output from the peripheral circuitry; and an internal memory test bus used when data is output from the internal memory unit and input to the I/O unit.

It is preferable that the external and internal access buses are constructed to have a latch structure so as to be connected to each other.

It is preferable that the data bus system further includes a CPU read bus which acts as a path of the movement of data between the CPU and the internal access bus; a first three-phase buffer which is enabled in response to a CPU read signal and enabling data to move via the CPU read bus; a CPU write bus which acts as a path of the movement of data between the CPU and the external access bus; and a second three-phase bus which is enabled in response to a CPU write signal and enabling data to move via the CPU write bus.

It is preferable that the data bus system further includes an internal memory read control block which is positioned between the internal memory unit and the internal access bus in order to read data in the internal memory unit; and an internal memory write control block which is positioned between the internal memory unit and the external access bus in order to write data to the internal memory unit.

It is preferable that the data bus system further includes a peripheral circuitry read bus that acts as a path of the movement of data from the peripheral circuitry to the internal access bus; a third three-phase buffer that is enabled in response to a peripheral circuitry read signal and enabling data to move via the peripheral circuitry read bus; a peripheral circuitry write bus which acts as a path of the movement of data from the internal access bus to the peripheral circuitry; and a fourth three-phase buffer which is enabled in response to a peripheral circuitry write signal and enabling data to move via the peripheral circuitry write bus.

It is preferable that that data bus system further includes a fifth three-phase buffer which is enabled in response to a predetermined enable signal and enabling data to be moved between the internal memory unit an the internal memory test bus.

It is preferable that the enable signal is an output signal output from an AND gate when an internal memory access enable signal, a test mode signal, and an internal memory access signal are input to the AND gate. Also, the internal memory access enable signal is generated in synchronization with a system clock, and the data in the internal memory unit is dumped in synchronization with a rising edge of the internal memory access enable signal.

It is preferable that the data bus system further includes a data port used to transmit external data; a data port control block which controls data in the data port; and an external data bus which acts as a path of the movement of data among the data port, the data port control block, and the external access bus.

The data bus system may further include a sixth three-phase buffer which is enabled in response to a predetermined enable signal and enabling data to be moved from the internal memory test bus to the data port control block.

It is preferable that the enable signal is an output signal output from the AND gate when a test mode signal and an internal memory enable signal are input to the AND gate.

It is preferable that the data bus system further includes a seventh three-phase buffer which is enabled in response to an external data write signal and enabling data to be moved from the internal access bus to the data port control block; and an eighth three-phase buffer which is enabled in response to an internal memory read signal and enabling data to be moved from the internal access bus to the data port control block.

It is preferable that the data bus system further includes a ninth three-phase buffer which is enabled in response to a predetermined enable signal and enables data to be moved from the data port to the external access bus.

It is preferable that the enable signal is an output signal output from an OR gate when an internal memory write signal, an external data read signal, and an internal memory read signal are input to the OR gate.

BRIEF DESCRIPTION OF THE DRAWINGS

The above aspect and advantages of the present invention will become more apparent by describing in detail preferred embodiments thereof with reference to the attached drawing in which.

DETAILED DESCRIPTION OF THE INVENTION

Figure 1:
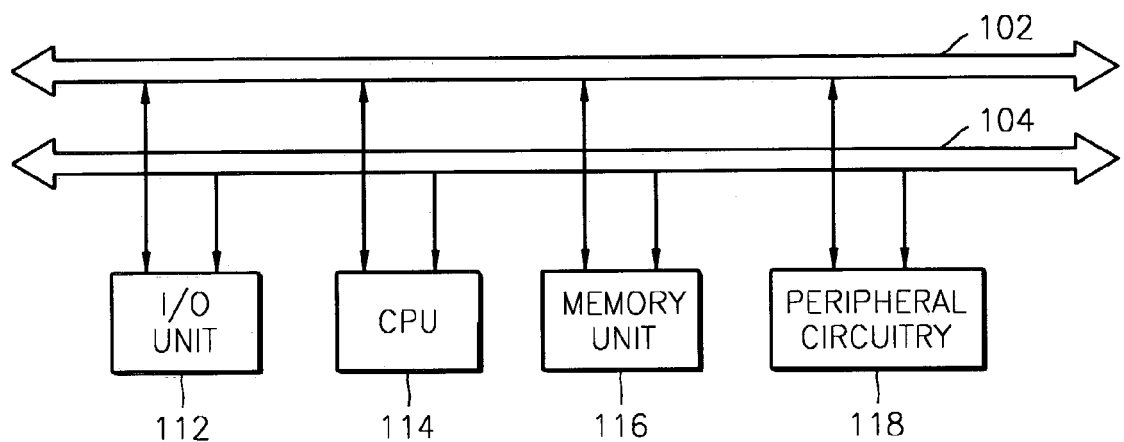
FIG. 1 is a block diagram of an example of a data bus system for a conventional micro controller.

The present invention will now be described more fully with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete and will fully convey the concept of the invention to those skilled in the art. The same reference numerals in different drawings represent the same element and thus their descriptions will not be repeated.

Figure 2:
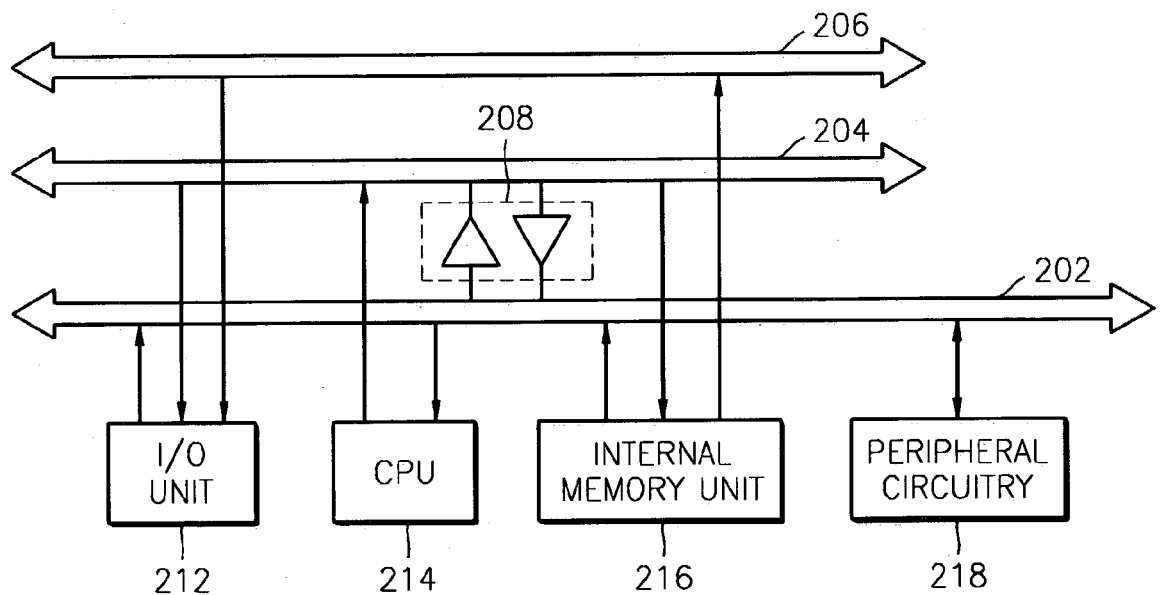
FIG. 2 is a schematic block diagram of a data bus system for a micro controller, according to an embodiment of the present invention.

FIG. 2 is a block diagram of a data bus system for a micro controller, according to an embodiment of the present invention. The data bus system includes at least three bus structures, i.e., an internal access bus 202, an external access bus 204, and an internal memory test bus 206. The internal access bus 202 and the external access bus 204 are connected to each other via a latch structure 208. The internal access bus 202, the external access bus 204, and the internal memory test bus 206 are connected to an input/output (I/O) unit 212, a central processing unit (CPU) 214, an internal memory unit 216, and a peripheral circuitry 218, which are constitutional elements of a micro controller, in order to provide paths for the movement of data to the above elements of the micro controller. In detail, input and output of data from and to the outside are made using the I/O unit 212. The CPU 214 generates various types of control signals for controlling the elements of the micro controller, and performs general operations on and processes data. The internal memory unit 216 is a place where a program for driving the micro controller is stored. The internal memory unit 216 may be volatile or non-volatile memory unit and can store applications as well as system programs. The peripheral circuitry 218 includes various types of peripheral circuits, in which the types of the peripheral circuits to be included in the peripheral circuitry 218 depend on the uses and performance of the micro controller. For instance, the peripheral circuits may include a timer, an analog-to-digital (A/D) converter, a digital-to-analog (D/A) converter, and a host interface circuit.

The internal access bus 202 is used to input data to the CPU 214 and output data from the I/O unit 212 or the internal memory unit 216. In addition, the internal access bus 202 can be used to input or output data to or from the peripheral circuitry 218. The external access bus 204 is used to output data from the CPU 214 or input data to the I/O unit 212 or the internal memory unit 216. The internal memory test bus 206 is used to move data from the internal memory unit 216 to the I/O unit 212 in an internal memory test mode.

Figure 3:
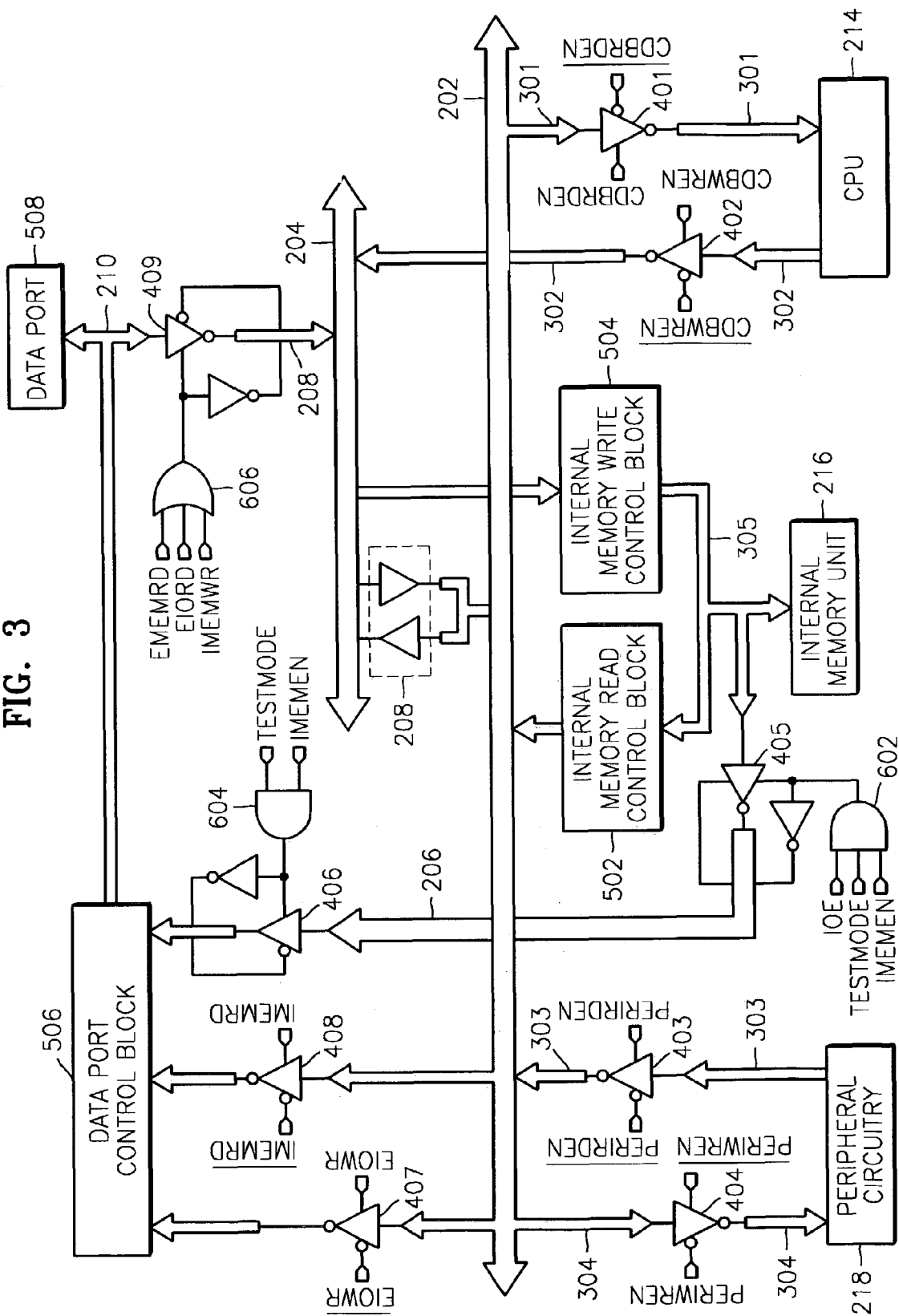
FIG. 3 is a circuit diagram of the data bus system of FIG. 2.

FIG. 3 is a circuit diagram of the data bus system of FIG. 2. Referring to FIG. 3, a CPU read bus 301 and a first three-phase buffer 401 are located between the CPU 214 and the internal access bus 202. When the first three-phase buffer 401 is opened in response to an enable signal CDBRDEN, data in the internal access bus 202 is sent to the CPU 214 via the CPU read bus 301 and the first three-phase buffer 401. Also, a CPU write bus 302 and a second three-phase buffer 402 are positioned between the CPU 214 and the external access bus 204. When the second three-phase buffer 402 is opened in response to an enable signal CDBWREN, the data in the CPU 214 is sent to the external access bus 204 via the CPU write bus 302 and the second three-phase buffer 402.

Between the peripheral circuitry 218 and the internal access bus 202, a peripheral circuitry read bus 303 and a third three-phase buffer 403, and a peripheral circuitry write bus 304 and a fourth three-phase buffer 404 are positioned. When the third three-phase buffer 403 is opened in response to an enable signal PERIRDEN, data in the peripheral circuitry 218 is transmitted to the internal access bus 202 via the peripheral circuitry read bus 303 and the third three-phase buffer 403. Similarly, when the fourth three-phase buffer 404 is opened in response to an enable signal PERIWREN, data in the internal access bus 202 is transmitted to the peripheral circuitry 218 via the peripheral circuitry read bus 304 and the fourth three-phase buffer 404.

Between the internal memory unit 216 and the internal access bus 202, an internal memory read control block 502, an internal memory write control block 504, and a memory bus 305 are installed. The internal memory read control block 502 generates control signals for controlling the exchange of data between the memory bus 305 and the internal access bus 202 when data in the internal memory unit 216 is read. The internal memory write control block 504 generates control signals for controlling the exchange of data between the memory bus 305 and the external access bus 204 when data is written to the internal memory unit 216. The internal memory read control block 502 and the internal memory read control block 504 are not used during the use of an external memory unit. The memory bus 305 provides a path for the movement of data between the internal memory unit 216 and the internal access bus 202 or between the internal memory unit 216 and the external access bus 204.

The internal memory unit 216 is connected to a data port control block 506 via the internal memory test bus 206. The internal memory test bus 206 is used only in the internal memory test mode. For instance, if the internal memory unit 216 is an only readable memory unit having a greater capacitance, an internal memory test may be performed on the internal memory unit 216 using the internal memory test bus 206 and the data port control block 506. In this case, the internal memory test can be speedily completed without interfering with the exchange of data between other elements.

A fifth three-phase buffer 405 is positioned between the internal memory test bus 206 and the memory bus 305, and a sixth three-phase buffer 406 is positioned between the internal memory test bus 206 and the data port control block 506. An enable signal for enabling the fifth three-phase buffer 405 is an output signal output from a first AND gate 602. An internal memory enable signal IMEMEN, a test mode enable signal TESTMODE, and an internal memory access enable signal IOE are input to an input terminal of the first AND gate 602. When all of the internal memory enable signal IMEMEN, the test mode enable signal TESTMODE, and the internal memory access enable signal IOE, are input at a high level to the first AND gate 602, the fifth three-phase buffer 405 is opened, thereby enabling data to be transmitted between the internal memory unit 216 and the internal memory test bus 206. An enable signal for enabling a sixth three-phase buffer 406 are an output signal output from a second AND gate 604. The output signal is output from the second AND gate 604 when an internal memory enable signal IMEMEN and a test mode enable signal TESTMODE are input to an input terminal of the second AND gate 604. When all of the internal memory enable signal IMEMEN and a test mode enable signal TESTMODE are input at a high level to the second AND gate 604, the sixth three-phase buffer 406 is opened and then data is transmitted between the internal memory test bus 206 and the data port control block 506.

A seventh three-phase buffer 407 and a eighth three-phase buffer 408 are positioned between the data port control block 506 and the internal access bus 202. An enable signal for enabling the seventh three-phase buffer 407 is an external data write signal EIOWR and an enable signal for enabling the eighth three-phase buffer 408 is an internal memory write signal IMEMRD. That is, when external data is written, the external data write signal EIOWR is input at a high level to the seventh three-phase buffer 407, the seventh three-phase buffer 407 is opened and then data is sent from the internal access bus 202 to the data port control block 506. Likewise, when internal data is read, the internal memory read signal IMEMRD is input at a high level to the eighth three-phase buffer 408, the eighth three-phase buffer 408 is opened and then data is sent from the internal access bus 202 to the data port control block 506. The data sent to the data port control block 506 is transmitted to a data port 508 via an external data bus 210.

The data port 508 is used when external data is read via an external pin, internal memory is written, or external data is read from an external memory unit (not shown). Therefore, the data port 508 is connected to the external access bus 204 via the eighth three-phase buffer 408. An enable signal for enabling the ninth three-phase buffer 409 is an output signal output from an output terminal of an OR gate 606. The output signal is output from the OR gate 606 when an internal memory write signal IMEMWR, an external data read signal EIORD, and an external memory read signal EMEMRD are input to an input terminal of the OR gate 606. The output signal of a high level is output from an output terminal of the OR gate 606 when the internal memory unit 216 is used, external data is read, or an external memory unit (not shown) is used. The ninth three-phase buffer 409 is opened in response to the output signal, and then, data is transmitted from the data port 508 to the external access bus 204.

Hereinafter, the movement of data between the constitutional elements of a micro controller of such a data bus system will be explained in greater detail.

First, for the movement of data from the CPU 214 to the peripheral circuitry 218, enable signals are applied to the second three-phase buffer 402 and the fourth three-phase buffer 404, respectively. Then, the second three-phase buffer 402 and the fourth three-phase buffer 404 are opened, and the data in the CPU 214 is sequentially moved through the CPU write bus 302, the external access bus 204, the internal access bus 202, the peripheral circuitry write bus 304, and finally, to the peripheral circuitry 218. For the movement of data from the peripheral circuitry 218 to the CPU 214, the data in the peripheral circuitry 218 is sequentially moved through the peripheral circuitry read bus 303, the internal access bus 202, the CPU read bus 301, and finally, to the CPU 214. In this case, the first and third three-phase buffers 401 and 403 are opened in response to related enable signals, respectively.

Next, for the movement of data from the CPU 214 to the internal memory unit 216, data in the CPU 214 is sequentially moved through the CPU read bus 302, the external access bus 204, the internal memory write control block 504, the memory bus 305, and finally, to the internal memory unit 216 while the second three-phase buffer 402 is open. In contrast, for the movement of data from the internal memory unit 216 to the CPU 214, data in the internal memory unit 216 is sequentially moved through the memory bus 305, the internal memory read control block 502, the internal access bus 202, the CPU read bus 301, and finally, to the CPU 214 while the first three-phase buffer 401 is open.

For the movement of data from the peripheral circuitry 218 to the internal memory unit 216, data in the peripheral circuitry 218 is sequentially moved through the peripheral circuitry read bus 303, the internal access bus 202, the external access bus 204, the internal memory write control block 504, the internal memory bus 305, and finally, to the internal memory unit 216 while the third three-phase buffer 403 is open. Adversely, for the movement of data from the internal memory unit 216 to the peripheral circuitry 218, data in the internal memory unit 216 is sequentially moved through the internal memory bus 305, the internal memory read control block 502, the internal access bus 202, the peripheral circuitry write bus 304, and finally, to the peripheral circuitry 218 while the fourth three-phase buffer 404 is open.

For the movement of data from an external memory unit (not shown) to the CPU 214, data, which is input from the external memory unit via the data port 508, is moved to the external access bus 204 via the external data bus 210 while the ninth three-phase buffer 409 is open. During the movement of the data, the ninth three-phase buffer 409 is enabled by the output from the OR gate 606 which is output in response to the external memory read signal EMERD. The data moved to the external access bus 204 passes through the internal access bus 202 and is moved to the CPU 214 via he CPU read bus 301 while the first three-phase buffer 401 is open. The data in the external memory unit can be moved to the peripheral circuitry 218. In this case, a process of moving the data to the peripheral circuitry 218 is the same as a process of moving data to the internal access bus 202. The data moved to the internal access bus 202 is moved to the peripheral circuitry 218 via the peripheral circuitry write bus 304 while the fourth three-phase buffer 404 is open.

Figure 4:
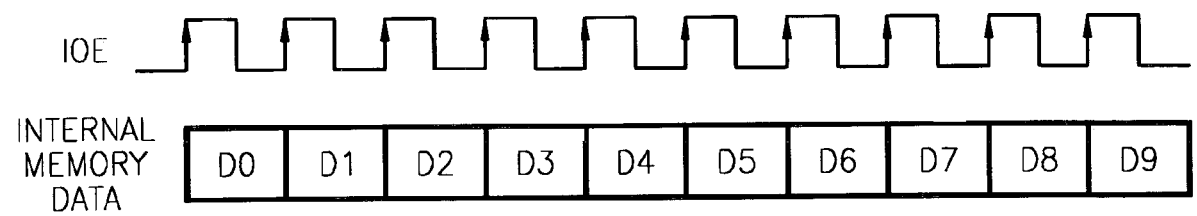
FIG. 4 is a diagram illustrating the movement of internal memory data in response to a clock signal when a data bus system for a micro controller, according to an embodiment of the present invention, is in a test mode.

FIG. 4 is a diagram illustrating the movement of internal memory data in response to a clock signal when a data bus system for a micro controller is in a test mode, according to an embodiment of the present invention. Referring to FIG. 4, an internal memory access signal IOE is generated in synchronization with a clock signal, and data D0 through D9 stored in the internal memory unit 216 of FIG. 2 is dumped in synchronization with a rising edge of the internal memory access signal IOE. The synchronization of the internal memory access signal IOE with the clock signal causes the dumping speed of the data to be proportional to the clock signal. As a result, a test of the internal memory unit 216 can be performed with one cycle access to the internal memory unit 216, thereby reducing the time spent on the test.

As described above, in a data bus system for a micro controller according to the present invention, data buses are divided into an internal access bus, an external access bus, and an internal memory test bus and are appropriately positioned according to their functions and purposes. Further, the internal access bus and the external access bus are constructed to have a latch structure so as to be connected to each other. For this reason, the movement of data between unit devices, which constitute the micro controller, such as a CPU, an internal memory unit, and a peripheral circuitry can be performed without weighing down the buses. Accordingly, the micro controller can operate at high speed and power consumption thereof can also be reduced. Also, it is possible to fast perform a test of an internal memory unit using the data bus system.

What is claimed is:

1. A data bus system that has an input/output (I/O) unit, a central processing unit (CPU), an internal memory unit, and a peripheral circuitry, the data bus system comprising:
   an external access bus used when data is output from the CPU or data is input to the I/O unit or the internal memory unit;
   an internal access bus used when data is input to the CPU, data is output from the I/O unit or the internal memory unit, or data is input to or output from the peripheral circuitry; and
   an internal memory test bus used when data is output from the internal memory unit and input to the I/O unit, wherein
   the CPU is connected to an external access bus and an internal access bus:
   the internal memory unit is connected to the external access bus, the internal access bus and a test bus:
   the I/O unit is connected to the external access bus, the internal access bus and the test bus;
   the periphery circuitry is connected only to the internal access bus;
   the internal access bus is connected to the external access bus with a latch; and
   the data bus system can access all of an internal/external memory, an external porter and internal periphery circuits, and can also access an internal memory test mode using a read only internal memory test bus.

2. The data bus system of claim 1, wherein the external and internal access buses are constructed to have a latch structure so as to be connected to each other.

3. The data bus system of claim 1, further comprising:
   a CPU read bus which acts as a path of the movement of data between the CPU and the internal access bus;
   a first three-phase buffer which is enabled in response to a CPU read signal and enabling data to move via the CPU read bus;
   a CPU write bus which acts as a path of the movement of data between the CPU and the external access bus; and
   a second three-phase buffer which is enabled in response to a CPU write signal and enabling data to move via the CPU write bus.

4. The data bus system of claim 1, further comprising:
   an internal memory read control block which is positioned between the internal memory unit and the internal access bus in order to read data in the internal memory unit; and
   an internal memory write control block which is positioned between the internal memory unit and the external access bus in order to write data to the internal memory unit.

5. The data bus system of claim 1, further comprising:
   a peripheral circuitry read bus that acts as a path of the movement of data from the peripheral circuitry to the internal access bus;
   a third three-phase buffer that is enabled in response to a peripheral circuitry read signal and enabling data to move via the peripheral circuitry read bus;
   a peripheral circuitry write bus which acts as a path of the movement of data from the internal access bus to the peripheral circuitry; and
   a fourth three-phase buffer which is enabled in response to a peripheral circuitry write signal and enabling data to move via the peripheral circuitry write bus.

6. The data bus system of claim 1, further comprising a fifth three-phase buffer which is enabled in response to a predetermined enable signal and enabling data to be moved between the internal memory unit and the internal memory test bus.

7. The data bus system of claim 6, wherein the enable signal is an output signal output from an AND gate when an internal memory access enable signal, a test mode signal, and an internal memory access signal are input to the AND gate.

8. The data bus system of claim 7, wherein the internal memory access enable signal is generated in synchronization with a system clock, and the data in the internal memory unit is dumped in synchronization with a rising edge of the internal memory access enable signal.

9. The data bus system of claim 1, further comprising:
   a data port used to transmit external data;
   a data port control block which controls data in the data port; and
   an external data bus which acts as a path of the movement of data among the data port, the data port control block, and the external access bus.

10. The data bus system of claim 9, further comprising a sixth three-phase buffer which is enabled in response to a predetermined enable signal and enabling data to be moved from the internal memory test bus to the data port control block.

11. The data bus system of claim 10, wherein the enable signal is an output signal output from the AND gate when a test mode signal and an internal memory enable signal are input to the AND gate.

12. The data bus system of claim 9, further comprising:
   a seventh three-phase buffer which is enabled in response to an external data write signal and enabling data to be moved from the internal access bus to the data port control block; and
   an eighth three-phase buffer which is enabled in response to an internal memory read signal and enabling data to be moved from the internal access bus to the data port control block.

13. The data bus system of claim 9, further comprising a ninth three-phase buffer which is enabled in response to a predetermined enable signal and enables data to be moved from the data port to the external access bus.

14. The data bus system of claim 13, wherein the enable signal is an output signal output from an OR gate when an internal memory write signal, an external data read signal, and an internal memory read signal are input to the OR gate.

* * * * *